(12) United States Patent  (10) Patent No.: US 8,482,808 B2
Shigehisa et al.  (45) Date of Patent: Jul. 9, 2013

(54) IMAGE PROCESSING APPARATUS AND METHOD FOR DISPLAYING A PREVIEW OF SCANNED DOCUMENT DATA

(75) Inventors: Kei Shigehisa, Amagasaki (JP); Takeshi Morikawa, Takarazuka (JP); Toshimichi Iwai, Kitakatsuragi-gun (JP); Kaitaku Ozawa, Itami (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 740 days.

(21) Appl. No.: 12/557,569

(22) Filed: Sep. 11, 2009

(65) Prior Publication Data

US 2010/0067064 A1 Mar. 18, 2010

(30) Foreign Application Priority Data

Sep. 17, 2008 (JP) ................................. 2008-238290

(51) Int. Cl.
*H04N 1/00* (2006.01)
(52) U.S. Cl.
USPC ........... 358/403; 715/230; 715/233; 715/241; 715/273
(58) Field of Classification Search
USPC ........................ 358/1.1–3.23; 715/200–277
See application file for complete search history.

(56) References Cited

U.S. PATENT DOCUMENTS

| 5,892,843 | A | 4/1999 | Zhou et al. |
| 2001/0018698 | A1* | 8/2001 | Uchino et al. ................. 707/533 |
| 2004/0139400 | A1* | 7/2004 | Allam et al. ................... 715/526 |
| 2004/0165232 | A1* | 8/2004 | Chiba et al. ................... 358/498 |
| 2006/0122956 | A1* | 6/2006 | Shimogori ........................ 707/1 |

FOREIGN PATENT DOCUMENTS

| JP | 10-260993 A | 9/1998 |
| JP | 2000-316082 A | 11/2000 |
| JP | 2001-008149 A | 1/2001 |
| JP | 2002-72991 A | 3/2002 |
| JP | 2008-033479 A | 2/2008 |
| JP | 2008-52496 A | 3/2008 |

OTHER PUBLICATIONS

Office Action from Japanese Patent Office issued in Applicant's corresponding Japanese Patent Application No. 2008-238290 dated Aug. 17, 2010, and an English Translation thereof.

* cited by examiner

*Primary Examiner* — Benny Q Tieu
*Assistant Examiner* — Marcellus Augustin
(74) *Attorney, Agent, or Firm* — Buchanan Ingersoll & Rooney PC

(57) ABSTRACT

An image processing system includes a client apparatus and a server apparatus. The server apparatus includes an item extraction unit, an item classification unit, and an image selection processing unit. The item extraction unit extracts a prescribed item from a document. The item classification unit classifies the extracted item into any of a plurality of groups. The image selection processing unit generates a display screen displaying each item included in read data in a manner different for each group. A display of the client apparatus displays the generated display screen.

18 Claims, 16 Drawing Sheets

FIG.3

IMAGE PROCESSING APPARATUS AND METHOD FOR DISPLAYING A PREVIEW OF SCANNED DOCUMENT DATA

This application is based on Japanese Patent Application No. 2008-238290 filed with the Japan Patent Office on Sep. 17, 2008, the entire content of which is hereby incorporated by reference.

BACKGROUND OF THE INVENTION

1. Field of the Invention

The present invention relates to an image processing apparatus and an image processing method. In particular, the present invention relates to an image processing apparatus and an image processing method for reading a document and generating a preview image of the read document.

2. Description of the Related Art

It has been conventionally implemented to display thumbnail images of image files on a display in order to specify or confirm an image file. A large amount of information on each image file can be obtained by displaying thumbnail images on a display, more significantly than a case where a search for a file is performed based on the file name, title name, or file number of the file. Therefore, a file search can be performed quickly. In addition, operation such as previewing image data obtained by scanning or receiving from another apparatus before outputting the image data to confirm the contents, direction, and the like thereof can be performed.

However, although an increase in thumbnail images causes an increase in the amount of information on image files, the increase in thumbnail images also makes it difficult to specify a desired image from among the thumbnail images. In particular, since it is not possible to display many images at once on a preview screen, it is difficult to specify a desired image.

Consequently, Japanese Laid-Open Patent Publication No. 2000-316082 proposes an apparatus for facilitating specification of an image. Upon reading a document with an arbitrary area surrounded with a marker or the like, the apparatus detects the area surrounded with a portion having specific brightness and concentration provided by the marker or the like from the document, and thereby extracts a read image of an arbitrarily designated partial area from a read image. The apparatus attaches the extracted read image of the partial area to the read image to be transferred or stored, and to the read image to be temporarily stored for printing and the like. Specifically, the apparatus specifies a characteristic portion of the document, and attaches an image of the specified portion to the entire read image.

Japanese Laid-Open Patent Publication No. 2002-072991 proposes an image processing apparatus and an image processing method for providing a thumbnail image with a pattern (i.e., shape pattern) or a color frame selected by a user to serve as a mark when performing classification, extraction, focusing, ordering, and the like for each image file. The user can classify or identify a thumbnail image based on the frame.

Japanese Laid-Open Patent Publication No. 2008-052496 proposes an image displaying apparatus and an image displaying method for generating list display with high visibility by analyzing a structure of an input image, dividing the input image into partial images such that each partial image is comprehensible, and arranging the partial images, in order to allow a user to understand the contents of a document from the list display of images such as thumbnails.

SUMMARY OF THE INVENTION

In the conventional techniques, it takes time to specify a desired page from among thumbnail images or a preview image.

In the case where a thumbnail image is generated by extracting a read image of an arbitrarily designated partial area from a read image as described in Japanese Laid-Open Patent Publication No. 2000-316082, information for specifying the thumbnail image is increased. However, a user is required to understand the entire contents of text to determine a portion to be extracted.

In the case of identifying a thumbnail image using the method described in Japanese Laid-Open Patent Publication No. 2002-072991, a user is required to classify the thumbnail image by himself/herself.

To search for a desired page from among list display of partial images as generated by the invention described in Japanese Laid-Open Patent Publication No. 2008-052496, a user is required to find out a desired page from among thumbnail images. Eventually, it takes as much time as searching for a desired page using ordinary list display of thumbnail images.

The present invention has been made to solve the problems as described above. A main object of the present invention is to provide an image processing apparatus and an image processing method for allowing a user to easily specify a desired page from among thumbnail images and a preview image.

An image processing apparatus in accordance with an aspect of the present invention includes: a display for displaying data; a scanner for scanning a document to obtain read data; and a controller configured to control the image processing apparatus. The controller extracts at least one item included in the read data, classifies the extracted item into one of a plurality of groups, and causes the display to display the extracted item included in the read data in a manner different for each group into which the extracted item is classified.

Preferably, the controller sets the at least one item to be extracted that is included in the read data based on an external instruction.

Preferably, the controller extracts at least one item from among items including a title, a heading, a figure, a table, a photograph, handwriting, and a keyword included in the read data.

Preferably, the controller determines whether the read data is a photograph, and when the read data is a photograph, the controller extracts the entire read data.

Preferably, the controller classifies the extracted item into the one of the plurality of groups based on an attribute set for the extracted item.

Preferably, the controller extracts at least one keyword included in the read data, and classifies the extracted item for each identical keyword.

Preferably, the image processing apparatus further includes an input apparatus receiving an external instruction. The controller receives selection of the extracted item included in the read data displayed on the display based on the instruction from the input apparatus, and causes the display to specifically display an item that belongs to one of the groups identical to that of the selected item and is different from the selected item.

In particular, the controller causes the display to specifically display the different item provided prior to or subsequent to the selected item included in the read data displayed on the display, based on the instruction from the input apparatus.

Preferably, the image processing apparatus further includes an input apparatus receiving an external instruction. The controller generates a bookmark item corresponding to the extracted item, causes the display to display an image including the bookmark item, receives selection of the bookmark item displayed on the display based on the instruction from the input apparatus, and causes the display to specifically display an item that belongs to one of the groups identical to that of the extracted item corresponding to the selected bookmark item and is different from the extracted item.

In particular, the controller causes the display to specifically display the different item provided prior to or subsequent to the selected item included in the read data displayed on the display, based on the instruction from the input apparatus.

Preferably, the controller generates a bookmark item corresponding to the extracted item belonging to a portion of the plurality of groups, and causes the display to display an image including the bookmark item.

Preferably, the controller causes the display to display the extracted item included in the read data in a form that allows the extracted item to be easily specified.

In particular, the controller causes the display to highlight an area including the extracted item.

In particular, the controller causes the display to display a frame for the extracted item.

In particular, the controller causes the display to display the extracted item in an enlarged manner.

Preferably, the controller causes the display to first specifically display the extracted item belonging to a prescribed group of the plurality of groups.

An image processing method in accordance with another aspect of the present invention includes the steps of: obtaining read data by scanning a document; extracting at least one item included in the read data; classifying the extracted item into one of a plurality of groups; and displaying on a display the extracted item included in the read data in a manner different for each group into which the extracted item is classified.

The foregoing and other objects, features, aspects and advantages of the present invention will become more apparent from the following detailed description of the present invention when taken in conjunction with the accompanying drawing.

BRIEF DESCRIPTION OF THE DRAWINGS

FIG. 3 shows an exemplary document.

DESCRIPTION OF THE PREFERRED EMBODIMENTS

Figure 1:
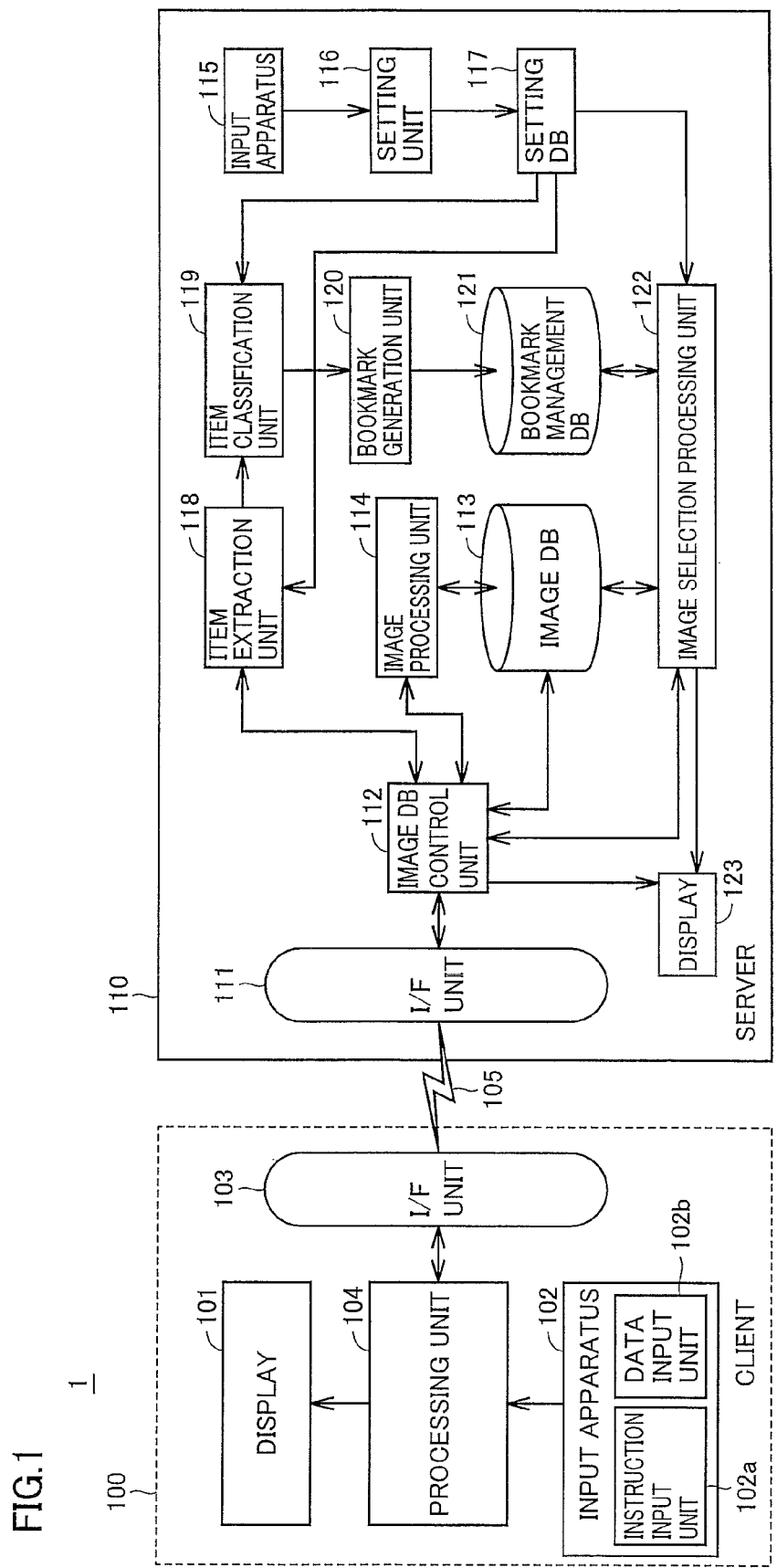
FIG. 1 shows a functional configuration of an image processing system in accordance with a first embodiment.

Embodiments of the present invention will now be described with reference to the drawings. In the following description, identical parts will be designated by the same reference numerals. Since names and functions thereof are also the same, detailed description thereof will not be repeated.

First Embodiment

1. System Configuration

A functional configuration of an image processing system 1 in accordance with a first embodiment will be described with reference to FIG. 1. FIG. 1 shows a functional configuration of image processing system 1 in accordance with the first embodiment.

Referring to FIG. 1, image processing system 1 includes a client apparatus 100 and a server apparatus 110. As client apparatus 100, for example, a personal computer (PC), a mobile terminal such as a mobile phone or a PDA (Personal Digital Assistant), or the like can be used.

Client apparatus 100 includes a display 101, an input apparatus 102, an interface (I/F) unit 103, and a processing unit 104.

Display 101 displays data inside client apparatus 100. As display 101, a known monitor or the like can be used.

Input apparatus 102 receives external input. Input apparatus 102 includes an instruction input unit 102a receiving an external instruction, and a data input unit 102b receiving input of data such as image data. As instruction input unit 102a, for example, a keyboard and a mouse can be used. As data input unit 102b, a scanner and the like can be used.

I/F unit 103 serves as an interface with an external communication channel 105. I/F unit 103 communicates with server apparatus 110 via external communication channel 105. As external communication channel 105, a LAN (Local Area Network), the Internet, or the like can be used.

Processing unit 104 controls display 101, interprets an instruction from a user or the like received by instruction input unit 102a, processes input data received by data input unit 102b, controls I/F unit 103, and the like. In the present embodiment, processing unit 104 is implemented by software such as an application program. However, the function of processing unit 104 may be implemented by hardware.

Server apparatus 110 outputs a preview image to client apparatus 100 in response to a request for viewing from client apparatus 100. Server apparatus 110 includes an I/F unit 111, an image DB (database) control unit 112, an image DB 113, an image processing unit 114, an input apparatus 115, a setting unit 116, a setting DB 117, an item extraction unit 118, an item classification unit 119, a bookmark generation unit 120, a bookmark management DB 121, an image selection processing unit 122, and a display 123.

I/F unit 111 serves as an interface with external communication channel 105. I/F unit 111 communicates with client apparatus 100 via external communication channel 105.

Image DB control unit 112 registers an image that I/F unit 111 receives from client apparatus 100 with image DB 113, and controls reading and the like of an image stored in image DB 113. Image DB 113 stores an image transmitted from client apparatus 100. Image processing unit 114 generates a thumbnail image of the image transmitted from client apparatus 100, and stores the thumbnail image in image DB 113.

Hereinafter, an image transmitted from client apparatus 100 will be referred to as an original image to distinguish it from a thumbnail image. In addition, an original image and a thumbnail image will be collectively referred to as a document image.

Input apparatus 115 receives input such as an external instruction. Based on an instruction received by input apparatus 115, setting unit 116 sets an item to be extracted by item extraction unit 118 from an original image, an item classification method performed by item classification unit 119, and the like. Setting DB 117 stores settings by setting unit 116.

Item extraction unit 118 extracts from an original image an item set according to an instruction from a user or the like. Examples of items extracted by item extraction unit 118 include a title of a document, a heading of a document, a keyword, handwriting, a table, a figure, and a photograph in a document, and the like. Item extraction unit 118 performs OCR (Optical Character Recognition) processing, extracts a keyword, extracts a figure in the form of an image, and the like.

In the present embodiment, item classification unit 119 classifies an item extracted by item extraction unit 118 (referred to as an extracted item) into a group based on an attribute of the item. Examples of attributes include "title", "heading", "keyword", "handwriting", "table", "figure", "photograph", and the like. Item classification unit 119 may assign one group to one attribute, or assign one group to a plurality of attributes. For example, item classification unit 119 may assign a group "table/figure" to both a table and a figure. An attribute is set beforehand for each item.

Bookmark generation unit 120 generates a bookmark based on the extracted items. Specifically, bookmark generation unit 120 generates a bookmark having the extracted items as bookmark items. Bookmark management DB 121 manages and stores the bookmark generated by bookmark generation unit 120.

Image selection processing unit 122 generates a preview image of a document, based on an original image or a thumbnail image stored in image DB 113, and an image of an area other than the original image or the thumbnail image in the preview image that is stored in image DB 113 beforehand (referred to as a stored image). In the present embodiment, image selection processing unit 122 generates a preview image including the bookmark stored in bookmark management DB 121.

Display 123 displays an image such as an image transmitted from client apparatus 100, a thumbnail image, and a preview image.

Figure 2:
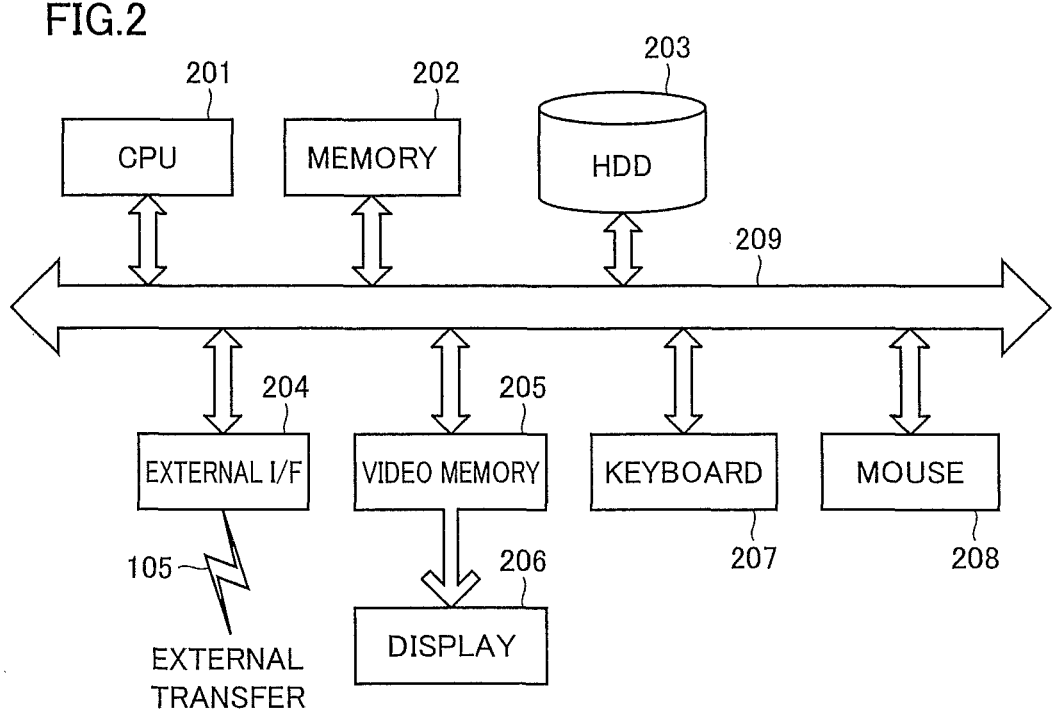
FIG. 2 shows a hardware configuration of a server apparatus.

A hardware configuration of server apparatus 110 will be described with reference to FIG. 2. FIG. 2 shows a hardware configuration of server apparatus 110.

Server apparatus 110 includes a CPU (Central Processing Unit) 201, a memory 202, an HDD (Hard Disc Drive) 203, an external I/F 204, a video memory 205, a display 206, a keyboard 207, a mouse 208, and a bus 209 connecting the components.

CPU 201 performs operation and processing according to a program. Memory 202 is used as a work area temporarily storing and holding data such as a code of a program and code data of an image. As memory 202, a volatile memory such as a DRAM (Dynamic Random Access Memory) or an SRAM (Static Random Access Memory) can be used. HDD 203 saves and stores image data, programs, and the like.

External I/F 204 receives and transmits data via external communication channel 105 such as the Internet or a LAN.

Video memory 205 temporarily stores data displayed on display 206 such as a monitor. Specifically, video memory 205 serves as a data buffer for the data displayed on display 206.

Keyboard 207 and mouse 208 serve as input apparatus 115. Keyboard 207 and mouse 208 are exemplary input devices. Server apparatus 110 may include an input device other than keyboard 207 and mouse 208.

Although FIG. 1 illustrates that client apparatus 100 and server apparatus 110 are separate apparatuses, the functions of the units shown in FIG. 1 may be implemented by one apparatus such as an MFP (Multifunction Peripheral) or a PC.

Further, image data stored in image DB 113 and image data displayed on display 123 are not limited to image data obtained by reading a document with a scanner. These data may include image data transmitted from an external apparatus and image data obtained via a Web browser.

2. Flow of Processing

Image processing system 1 in accordance with the present embodiment extracts from a document reading result (i.e., document images) prescribed items such as a photograph, a title, a heading, a figure, a table, handwriting, a keyword, and the like, and generates a bookmark including the extracted items. Then, image selection processing unit 122 of image processing system 1 previews or thumbnails the document together with the generated bookmark.

Figure 3:
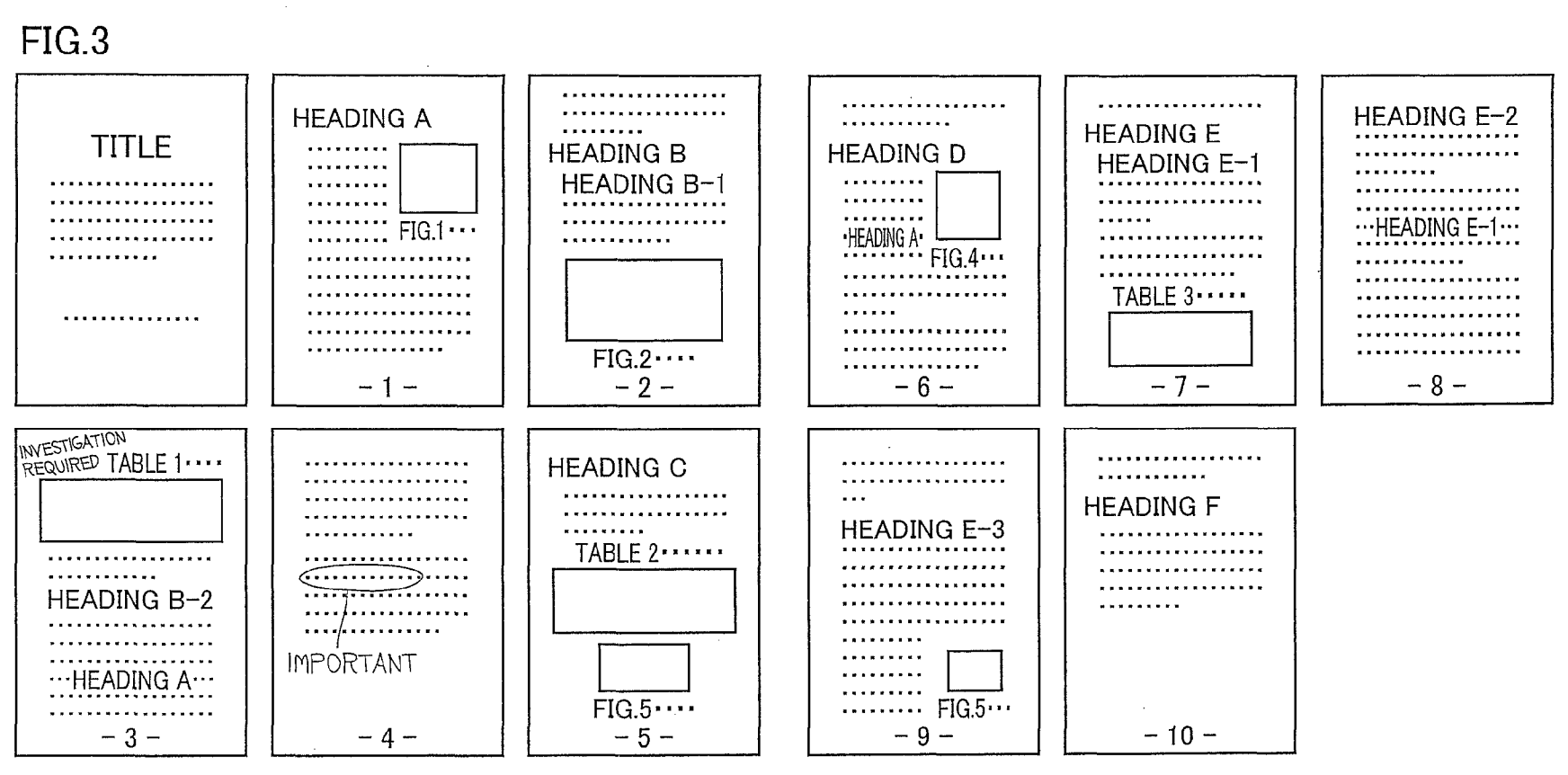
Figure 4:
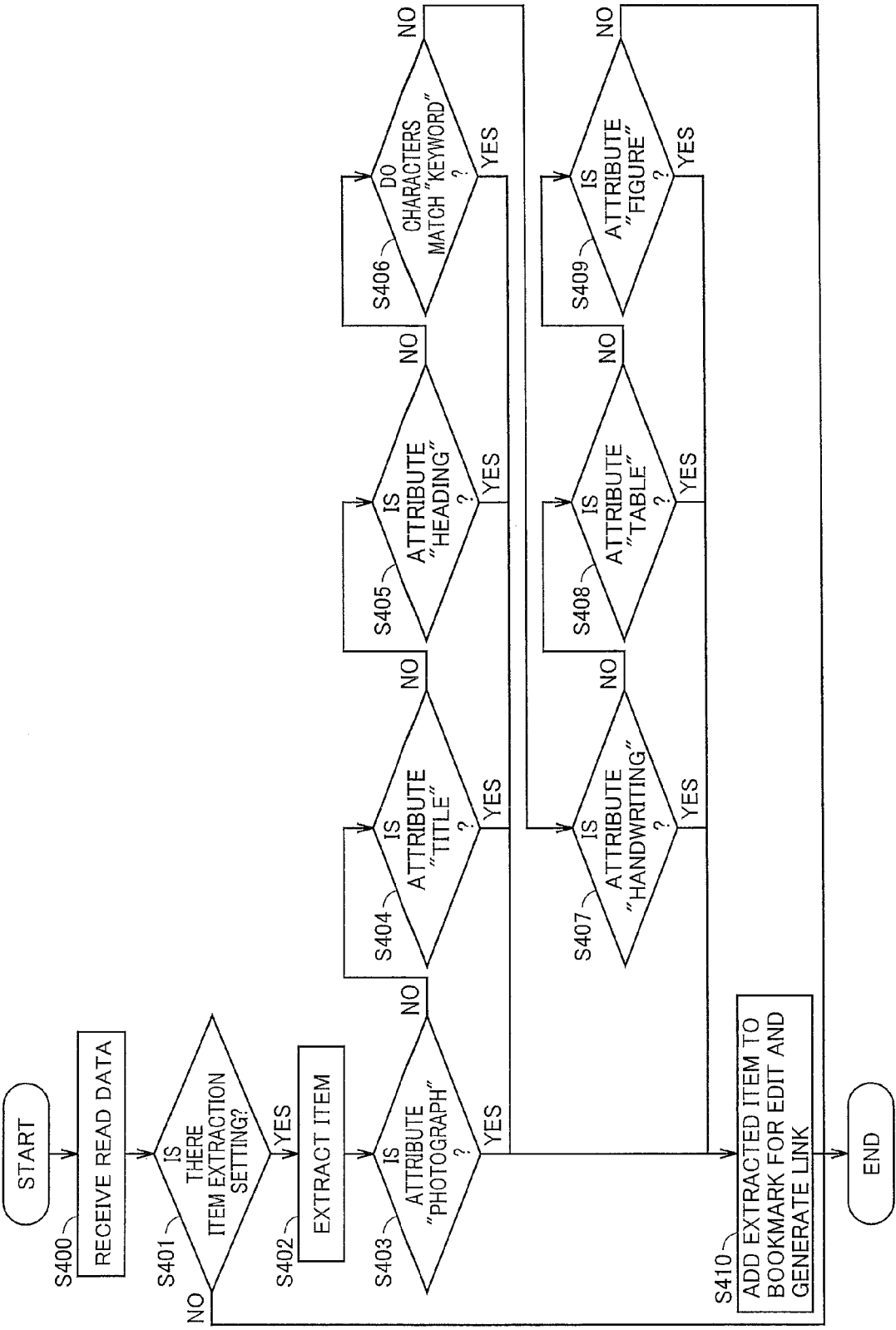
FIG. 4 shows an outline of processing performed by the image processing system in the form of a flowchart.

Processing up to generation of a bookmark will be described with reference to FIGS. 3 and 4. FIG. 3 shows an exemplary document. FIG. 4 shows an outline of processing performed by image processing system 1 in the form of a flowchart. Hereinafter, processing performed by server apparatus 110 in the case of extracting an item from a document as shown in FIG. 3 and generating a bookmark will be described with reference to FIG. 4.

At step S400, image DB control unit 112 stores in image DB 113 document images that I/F unit 111 receives from client apparatus 100. Image DB control unit 112 also transmits the document images to item extraction unit 118.

At step S401, item extraction unit 118 confirms whether there is an item extraction setting. Specifically, item extraction unit 118 confirms whether an item to be extracted is set in setting DB 117. If there is no item extraction setting (NO at step S401), server apparatus 110 terminates the processing. Specifically, item extraction unit 118 does not extract an item. Further, bookmark generation unit 120 does not generate a bookmark.

If there is an item extraction setting (YES at step S401), item extraction unit 118 extracts from the document images an item set in setting DB 117 as a subject of extraction at step S402. It is assumed herein that a photograph, a title of a document, a heading of the document, and a keyword, handwriting, a table, and a figure in the document are set in setting DB 117 as subjects of extraction.

In the case where a document image is a photograph, item extraction unit 118 extracts the entire document image as a "photograph". The "case where a document image is a photograph" includes a case where it is set beforehand that a document image is a photograph, and a case where item extraction unit 118 determines that a document image is a photograph based on image characteristics and the like of the document image.

At steps S403 to S409 described below, item classification unit 119 classifies an extracted item. Herein, item classification unit 119 classifies an extracted item based on an attribute of the item.

At step S403, item classification unit 119 determines whether the attribute of the extracted item is "photograph".

If the attribute of the extracted item is "photograph" (YES at step S403), bookmark generation unit 120 adds the extracted item as a "photograph" to a bookmark at step S410. Bookmark generation unit 120 generates a link between the item added to the bookmark and the extracted item in a document image.

If the attribute of the extracted item is not "photograph" (NO at step S403), item classification unit 119 determines whether the attribute of the extracted item is "title" at step S404.

If the attribute of the extracted item is "title" (YES at step S404), bookmark generation unit 120 adds the extracted item as a "title" to the bookmark at step S410. Bookmark generation unit 120 generates a link between the item added to the bookmark and the extracted item in a document image.

If the attribute of the extracted item is not "title" (NO at step S404), item classification unit 119 determines whether the attribute of the extracted item is "heading" at step S405. In the case where the heading has a hierarchical structure such as a big heading, a sub heading, and the like, item classification unit 119 also determines a hierarchical level of the heading.

If the attribute of the extracted item is "heading" (YES at step S405), bookmark generation unit 120 adds the extracted item as a "heading" to the bookmark at step S410. Bookmark generation unit 120 generates a link between the item added to the bookmark and the extracted item in a document image. In the case where the heading has a hierarchical structure, bookmark generation unit 120 adds the extracted item to the bookmark together with information on the hierarchical level.

If the attribute of the extracted item is not "heading" (NO at step S405), item classification unit 119 determines whether the attribute of the extracted item is "keyword" at step S406. Specifically, item classification unit 119 determines whether characters matching a set keyword are included in the extracted item.

If the keyword is included in the extracted item (YES at step S406), bookmark generation unit 120 adds the extracted item as a "keyword" to the bookmark at step S410. Bookmark generation unit 120 generates a link between the item added to the bookmark and the extracted item in a document image. In the case where a plurality of keywords are set, bookmark generation unit 120 distinguishes the keywords and resisters the extracted item with the bookmark.

If the keyword is not included in the extracted item (NO at step S406), item classification unit 119 determines whether the attribute of the extracted item is "handwriting" at step S407.

If the attribute of the extracted item is "handwriting" (YES at step S407), bookmark generation unit 120 adds the extracted item as "handwriting" to the bookmark at step S410. Bookmark generation unit 120 generates a link between the item added to the bookmark and the extracted item in a document image.

If the attribute of the extracted item is not "handwriting" (NO at step S407), item classification unit 119 determines whether the attribute of the extracted item is "table" at step S408.

If the attribute of the extracted item is "table" (YES at step S408), bookmark generation unit 120 adds the extracted item as a "table" to the bookmark at step S410. Bookmark generation unit 120 generates a link between the item added to the bookmark and the extracted item in a document image.

If the attribute of the extracted item is not "table" (NO at step S408), item classification unit 119 determines whether the attribute of the extracted item is "figure" at step S409.

If the attribute of the extracted item is "figure" (YES at step S409), bookmark generation unit 120 adds the extracted item as a "figure" to the bookmark at step S410. Bookmark generation unit 120 generates a link between the item added to the bookmark and the extracted item in a document image.

If the attribute of the extracted item is not "figure" (NO at step S409), bookmark generation unit 120 does not generate a bookmark.

In the case where a plurality of items are extracted at step S402, item classification unit 119 performs the processing at these steps (steps S403 to S410) for each of the extracted items. In the case where bookmark generation unit 120 adds a plurality of extracted items having an identical attribute as titles to the bookmark, bookmark generation unit 120 distinguishes the items to be added to the bookmark at step S410. For example, in the case where bookmark generation unit 120 extracts a plurality of items having the attribute "photograph", bookmark generation unit 120 adds the extracted items as "photograph 1", "photograph 2", . . . , and "photograph n" to the bookmark.

The order of the determinations at steps S403 to S409 may be changed. Further, a user can add an attribute to each item. In the case where a user adds an attribute, item classification unit 119 also makes a determination on the added attribute. Further, item classification unit 119 may classify the extracted item according to an attribute different from those described above.

3. As to Preview Image

In the present embodiment, image selection processing unit 122 generates a preview image including a document image or a thumbnail image and a bookmark. Further, image selection processing unit 122 selectably displays an extracted item in the document image or the thumbnail image and a bookmark item.

When a user selects a bookmark item or an extracted item in the document image in the preview image, image selection processing unit 122 in accordance with the present embodiment specifically displays an extracted item that has an attribute identical to that of an extracted item corresponding to the selected bookmark item or that of the selected extracted item in the document image and is different from the extracted item specifically displayed at present.

Hereinafter, a preview image generated by image selection processing unit 122 and transition of preview images in the case where an extracted item or a bookmark item in a preview image is selected will be described with reference to FIGS. 5 to 8.

Figure 5:
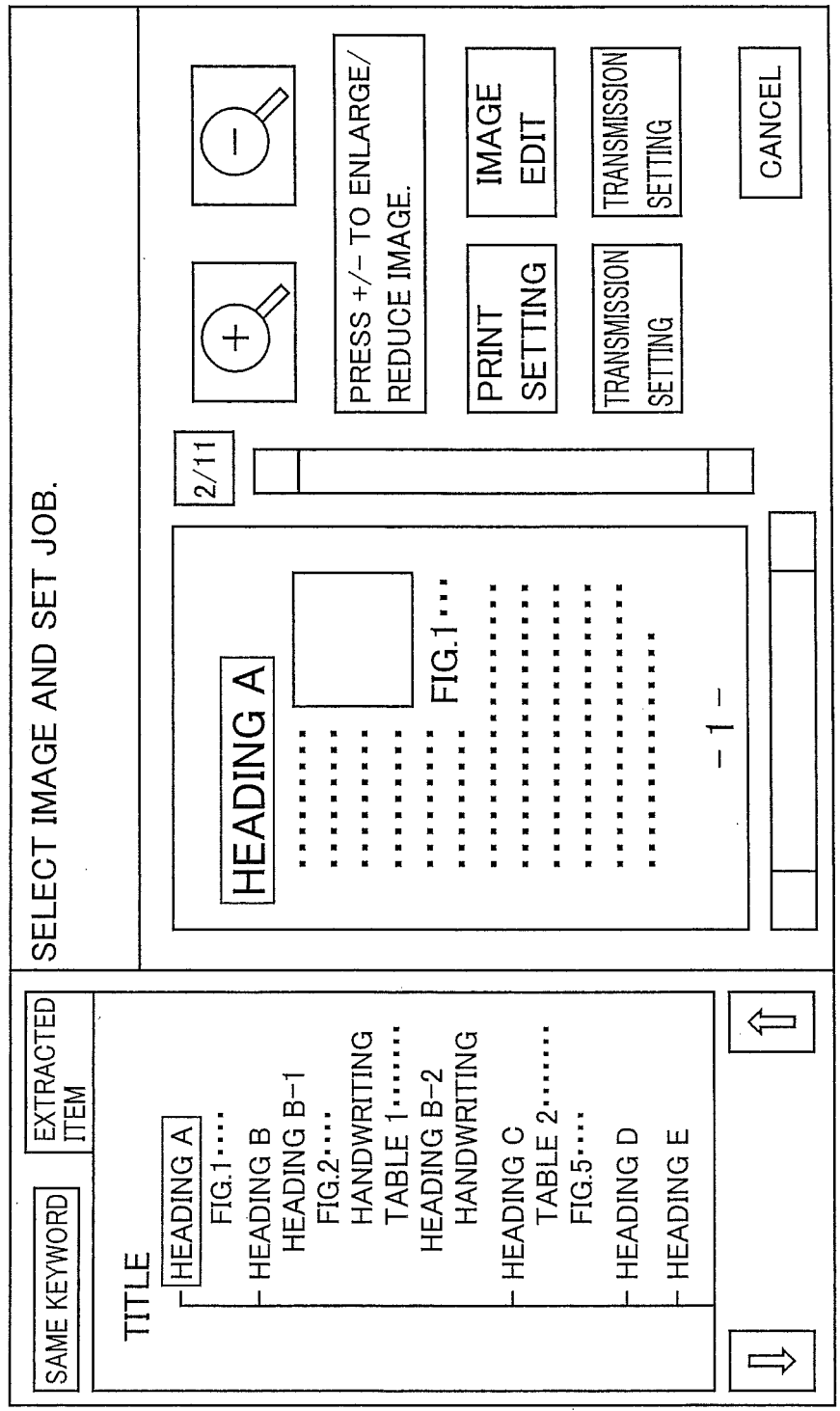
FIG. 5 shows a preview image previewing a first page of the document shown in FIG. 3.

FIG. 5 shows a preview image previewing a first page of the document shown in FIG. 3. Referring to FIG. 5, extracted items "Heading A" and "FIG. 1" are included in a document image of the previewed first page. In the present embodiment, image selection processing unit 122 generates a preview image in which an extracted item having the attribute "title" or "heading" is surrounded with a frame. Therefore, as shown in FIG. 5, "Heading A" is surrounded with a frame in the document image. That is, "Heading A" is specifically displayed in the preview image.

Further, the extracted item "Heading A" having the attribute "heading" is included in the document image of the previewed first page. Accordingly, the bookmark is in a state where "Heading A" is selected. In the present embodiment, image selection processing unit 122 generates a preview image in which the selected item in the bookmark (i.e., "Heading A") is surrounded with a frame.

A case where the preview image shown in FIG. 5 is displayed on display 101 of client apparatus 100 will be considered. If input apparatus 102 of client apparatus 100 selects the bookmark item "Heading A" or "Heading A" in the document image on this occasion, image selection processing unit 122 generates a preview image displaying a portion in which an extracted item having the attribute "heading" appears subsequently, i.e, a preview image displaying a second page including "Heading B" as shown in FIG. 6.

Figure 6:
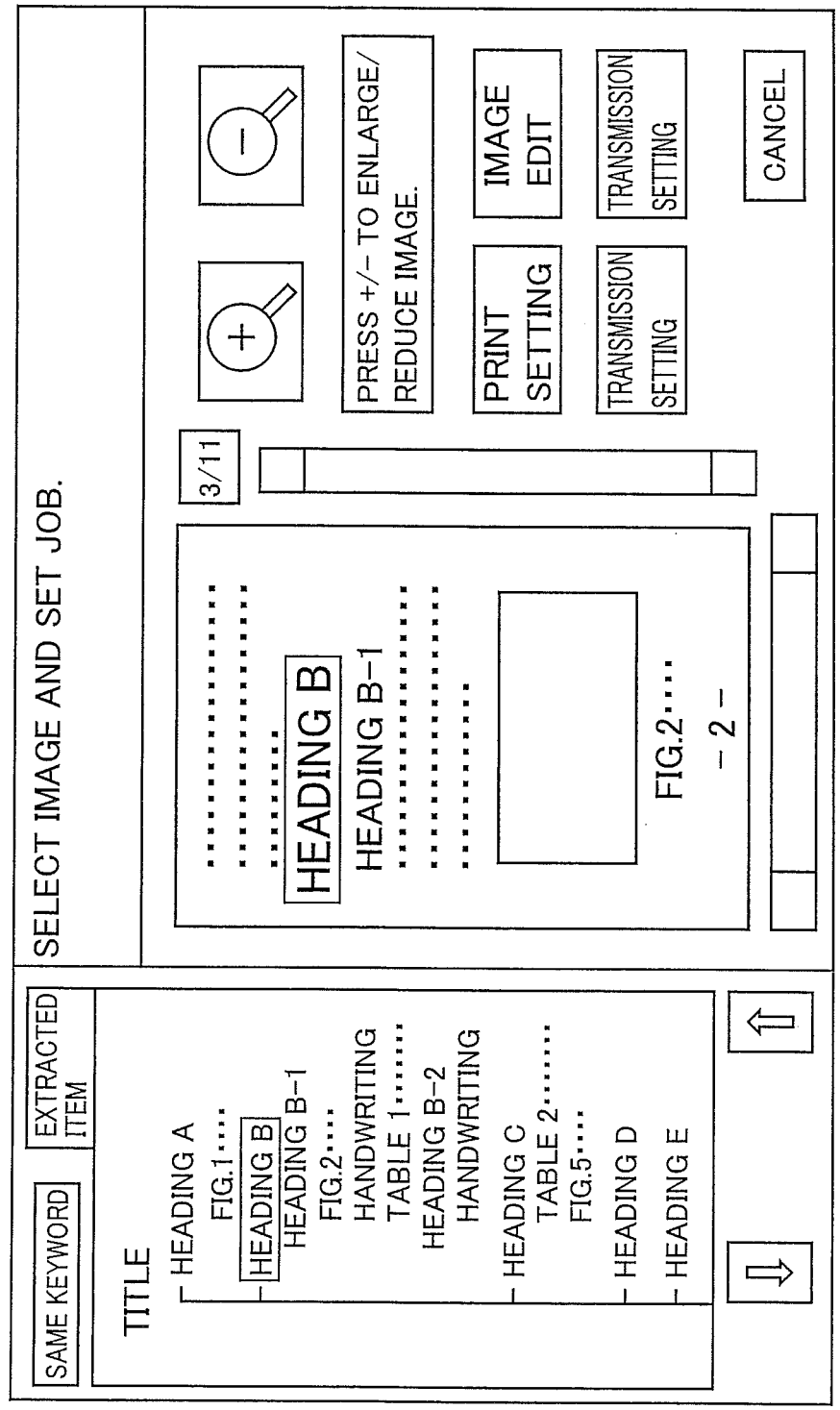
FIG. 6 shows a preview image previewing a second page of the document shown in FIG. 3.

FIG. 6 shows a preview image previewing the second page of the document shown in FIG. 3. Referring to FIG. 6, extracted items "Heading B", "Heading B-1" and "FIG. 2" are included in an image of the previewed second page. As described using FIG. 5, image selection processing unit 122 generates a preview image in which an extracted item having the attribute "title" or "heading" is surrounded with a frame. Therefore, as shown in FIG. 6, "Heading B" is surrounded with a frame in the document image. It is to be noted that image selection processing unit 122 is configured not to surround "Heading B-1" having a hierarchical level lower than that of "Heading B" with a frame.

Further, since the extracted item "Heading B" having the attribute "heading" is included in the document image of the previewed second page, the bookmark is in a state where "Heading B" is selected.

When "Heading B" in the bookmark or the document image is selected in the preview image shown in FIG. 6, image selection processing unit 122 generates a preview image of a page including "Heading C".

Image selection processing unit 122 also considers the level of a heading as an attribute. For example, when "Heading B-1" in the bookmark or the document image is selected, image selection processing unit 122 generates a preview image of a page including "Heading B-2".

Image selection processing unit 122 also performs similar processing when an item having another attribute is selected. For example, if "FIG. 1" is selected, image selection processing unit 122 generates a preview image of a page including "FIG. 2", and if "FIG. 2" is selected, image selection processing unit 122 generates a preview image of a page including "FIG. 3". Further, if "Table 1" is selected, image selection processing unit 122 generates a preview image of a page including "Table 2", and if "Table 2" is selected, image selection processing unit 122 generates a preview image of a page including "Table 3".

As described above, according to image processing system 1 in accordance with the present embodiment, a user can sequentially preview pages including extracted items having an identical attribute, and thus can easily search for a desired document image.

There may be a case where, although an extracted item is selected in a preview image of a page, an extracted item having an attribute identical to that of the selected extracted item is not present subsequent to the selected extracted item. In that case, if the extracted item on the page is selected, image selection processing unit 122 may generate a preview image of a page on which an extracted item having the identical attribute appears first.

Transition of preview images each previewing one specific page of the document images has been described above. Transition of preview images thumbnailing a document will be described with reference to FIGS. 7 and 8.

Figure 7:
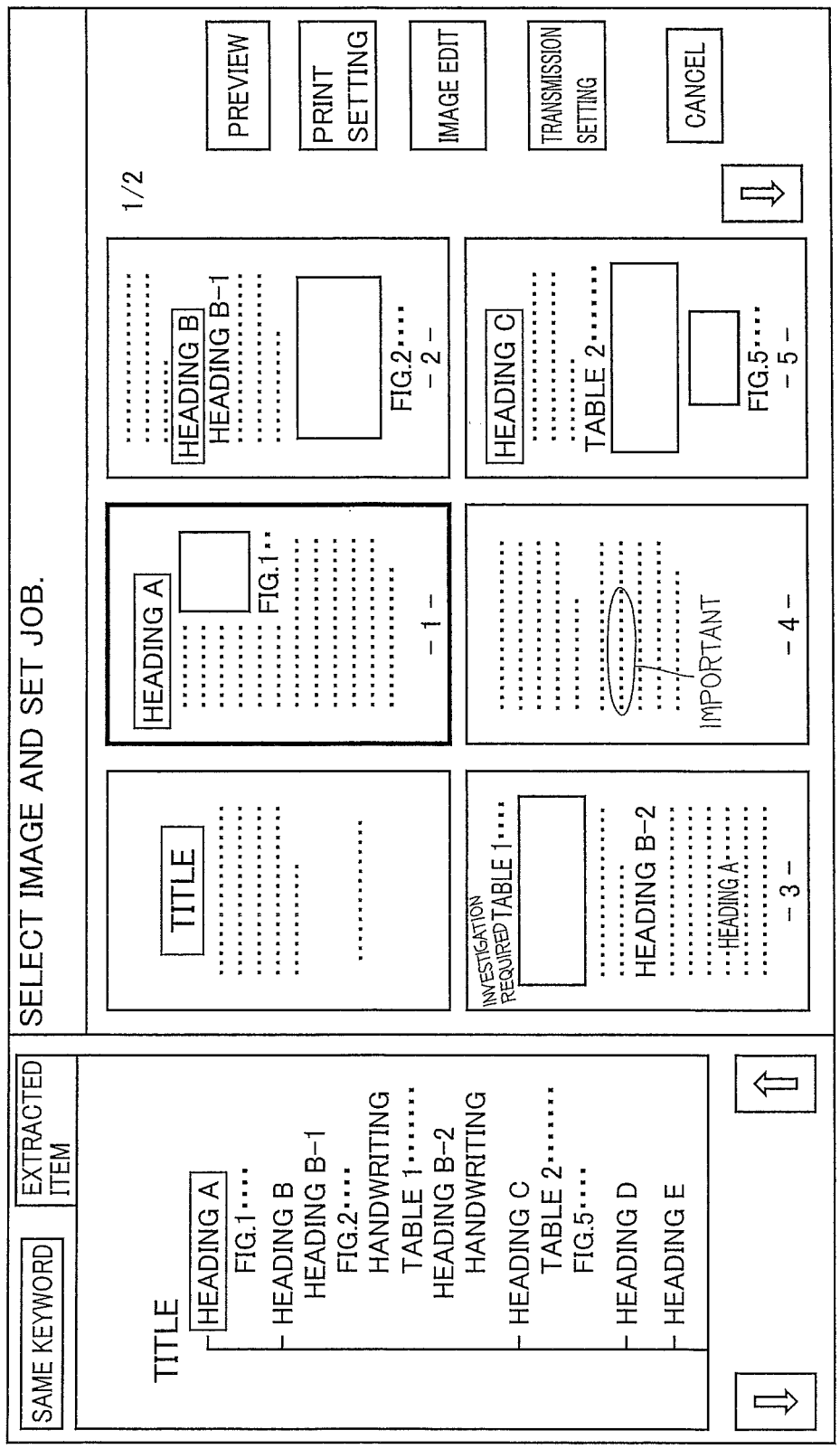
FIG. 7 shows a first example of a preview image thumbnailing the document shown in FIG. 3.

FIG. 7 shows a first example of a preview image thumbnailing the document shown in FIG. 3. FIG. 7 shows a preview image in a state where a thumbnail image of the first page of the document is selected. As shown in FIG. 7, the selected thumbnail image of the first page is surrounded with a frame. However, image selection processing unit 122 may generate a preview image specifying a selected page with a method other than using a frame.

In the present embodiment, image selection processing unit 122 generates a preview image in which an extracted item having the attribute "title" or "heading" is surrounded with a frame. Therefore, as shown in FIG. 7, the title and the headings are surrounded with frames in the thumbnail images in the preview image.

Further, the extracted item "Heading A" having the attribute "heading" is included in the selected thumbnail image of the first page. Accordingly, "Heading A" is also selected in the bookmark and surrounded with a frame.

Figure 8:
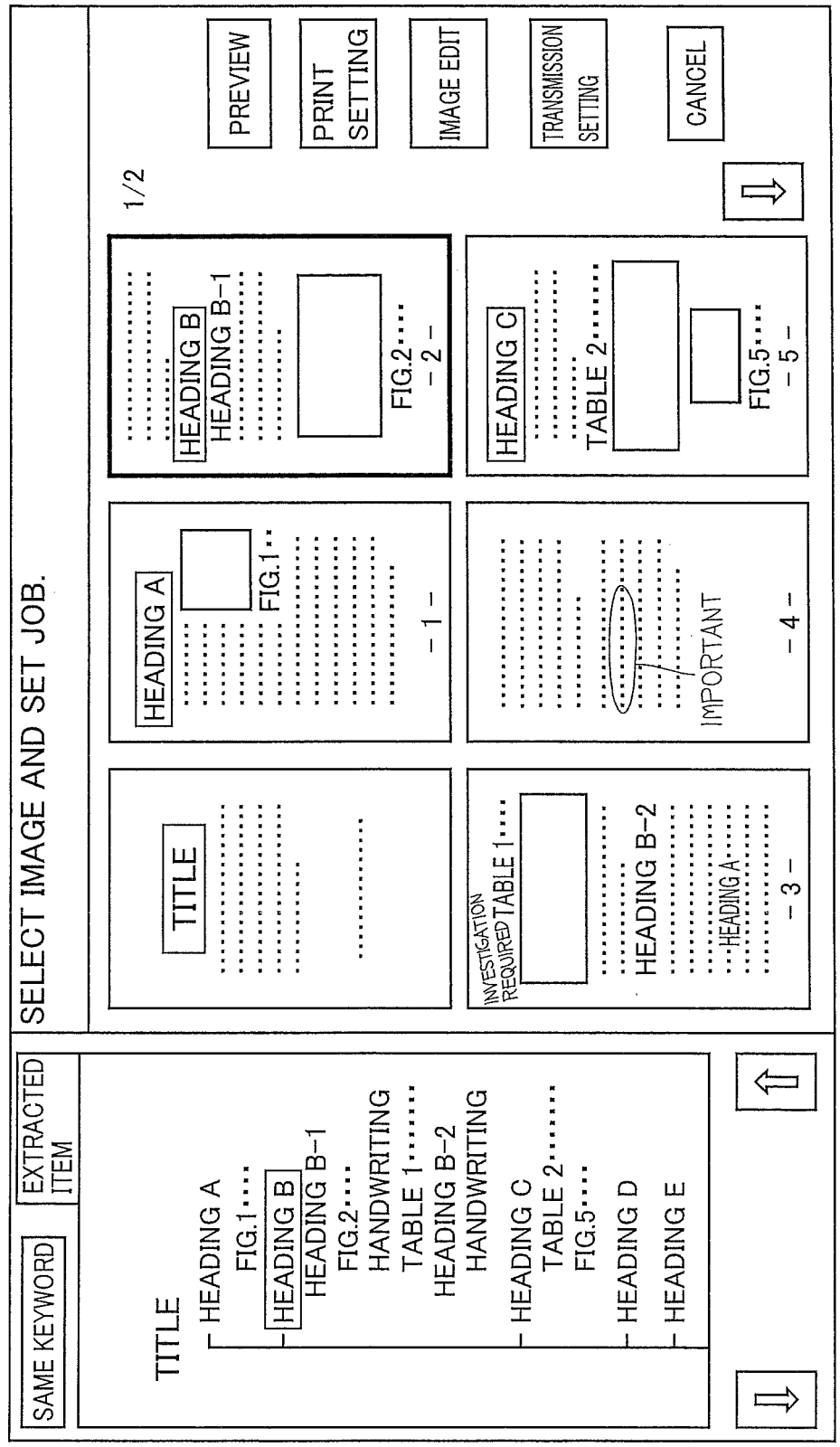
FIG. 8 shows a second example of the preview image thumbnailing the document shown in FIG. 3.

Upon receiving an instruction to select "Heading A" in the bookmark or the thumbnail image in a display state shown in FIG. 7, image selection processing unit 122 generates a preview image indicating that a page including "Heading B" is selected as shown in FIG. 8.

FIG. 8 shows a second example of the preview image thumbnailing the document shown in FIG. 3. FIG. 8 shows a preview image in a state where a thumbnail image of the second page of the document is selected. As with the preview image shown in FIG. 7, the title and the headings are surrounded with frames in the thumbnail images in the preview image shown in FIG. 8. The extracted item "Heading B" having the attribute "heading" is included in the selected thumbnail image of the second page. Accordingly, the bookmark is in a state where "Heading B" is selected.

In the examples described above, even when any of an item in the bookmark and an extracted item in a document image is selected, image selection processing unit 122 generates a preview image specifically displaying a page including an extracted item having an attribute identical to that of the selected item. However, only when either an item in the bookmark or an extracted item in a document image is selected, image selection processing unit 122 may generate a preview image of a page including an extracted item having an attribute identical to that of the selected item.

In the case where image selection processing unit 122 generates a new preview image only when an extracted item in a document image is selected, operation performed when an item in the bookmark is selected may be the one commonly used. For example, when an item displayed in the bookmark is selected, image selection processing unit 122 may generate a preview image of a document image including an extracted item linked to the selected item in the bookmark, as with the table of contents in the PDF (Portable Document Format) or the like.

Second Embodiment

Item classification unit 119 of image processing system 1 in accordance with the first embodiment classifies an item based on an attribute set for the item. However, item classification unit 119 may classify an item based on another method. In a second embodiment, image processing system 1 classifying an item based on a keyword of an extracted item will be described.

Since the configuration of image processing system 1 in accordance with the second embodiment is substantially the same as that described in the first embodiment with reference to FIGS. 1 and 2, description thereof will not be repeated here. However, the processing performed by item classification unit 119 and image selection processing unit 122 is different from that in the first embodiment, as described below.

If an extracted item is an item related to characters, item classification unit 119 in accordance with the second embodiment classifies the extracted item for each keyword of the item. Herein, the "item related to characters" includes a title and a heading.

Upon receiving an instruction to select a bookmark item related to characters or an extracted item related to characters in a document image, item classification unit 119 in accordance with the second embodiment specifically displays an extracted item having a keyword identical to that of an extracted item corresponding to the selected bookmark item or that of the selected extracted item in the document image.

A case where the preview image shown in FIG. 5 is displayed on display 101 of client apparatus 100 will be considered. If input apparatus 102 of client apparatus 100 selects the bookmark item "Heading A" or "Heading A" in the document image on this occasion, image selection processing unit 122 generates a preview image displaying a third page, which is a page subsequent to the displayed first page among pages including the selected item "Heading A", i.e, a preview image shown in FIG. 9.

Figure 9:
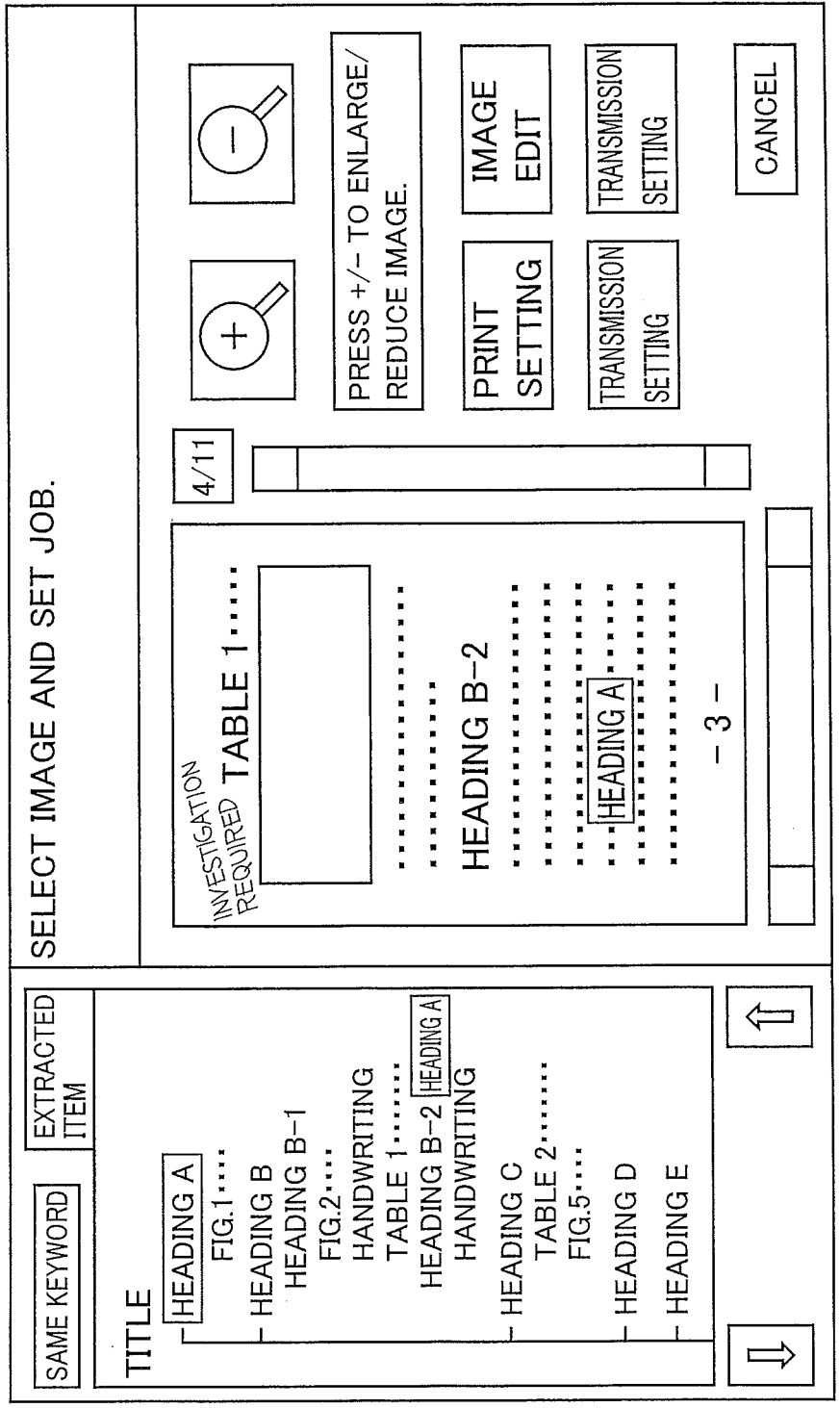
FIG. 9 shows a preview image previewing a third page of the document shown in FIG. 3.

FIG. 9 shows a preview image previewing the third page of the document shown in FIG. 3. As described using FIGS. 5 and 6, image selection processing unit 122 generates a preview image in which an extracted item having the attribute "heading" is surrounded with a frame. Therefore, as shown in FIG. 9, "Heading A" is surrounded with a frame in the document image. Further, "Heading A" corresponding to the third page of the document in the bookmark is also surrounded with a frame.

According to image processing system 1 in accordance with the present embodiment, a portion including a desired keyword can be easily searched for from among the document.

Third Embodiment

In the first embodiment and the second embodiment, description has been given of the case where, when a user selects a bookmark item or an extracted item in the document image in the preview image, image processing system 1 displays a subsequent page including an item that belongs to a group identical to that of the selected item. More concretely, image selection processing unit 122 generates a preview image specifically displaying a page including an item that has an attribute or a keyword identical to that of the selected item and is located subsequent to the selected item.

However, the form of transition of preview images is not limited thereto. In a third embodiment, image processing system 1 generating a preview image that allows a user to make transition to an item prior to or subsequent to the selected item will be described.

Since the configuration of image processing system 1 in accordance with the third embodiment is substantially the same as that described in the first embodiment or the second embodiment, description thereof will not be repeated here. However, the processing performed by image selection processing unit 122 is different from that in the first embodiment or the second embodiment, as described below.

Figure 10:
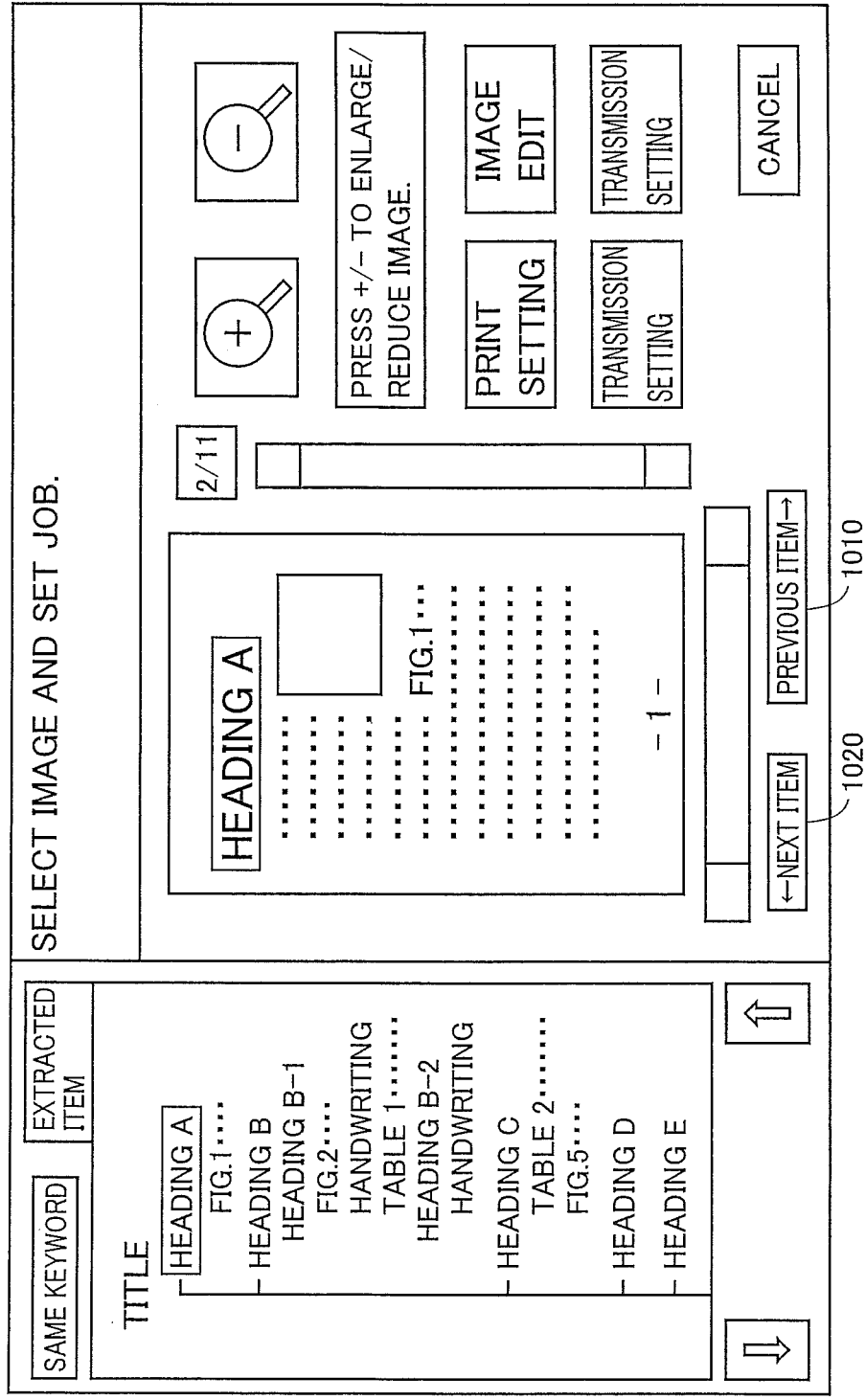
FIG. 10 shows a preview image previewing the first page of the document shown in FIG. 3 generated by an image processing system in accordance with a third embodiment.

Image selection processing unit 122 of image processing system 1 in accordance with the third embodiment generates a preview image as shown in FIG. 10.

FIG. 10 shows a preview image of the first page of the document shown in FIG. 3 generated by image processing system 1 in accordance with the third embodiment. Referring to FIG. 10, the preview image generated by image processing system 1 in accordance with the third embodiment includes a previous item button 1010 and a next item button 1020. The preview image in accordance with the third embodiment differs from the preview images in accordance with the first embodiment and the second embodiment in this regard.

Upon receiving an instruction to select previous item button 1010, image selection processing unit 122 generates a preview image specifically displaying a page that includes an item belonging to a group identical to that of an item selected in the preview image and has the largest page number among pages prior to the displayed page.

"Heading A" is selected in the image shown in FIG. 10. The selected "Heading A" is displayed with being surrounded with a frame in both of the document image and the bookmark. If there are a plurality of selectable items in the document image, image selection processing unit 122 selects one item based on an instruction from a user. Alternatively, image selection processing unit 122 may select an item based on a predetermined rule. For example, image selection processing unit 122 may select an item that appears first on a displayed page.

As can be seen from FIG. 3, there is no page including "Heading A" prior to the first page. Therefore, for example when previous item button 1010 is selected, image selection processing unit 122 generates an image warning that there is no page to which transition is to be made. Alternatively, image selection processing unit 122 may search for an item belonging to a group identical to that of a selected item, from the end of the document images, and generate a preview image specifically displaying a portion in which the item belonging to the identical group appears last.

On the other hand, upon receiving an instruction to select next item button 1020, image selection processing unit 122 generates a preview image specifically displaying a page that includes an item belonging to a group identical to that of an item selected in the preview image and has the smallest page number among pages subsequent to the displayed page.

As described in the first embodiment and the second embodiment, when a bookmark item or an extracted item in the document image is selected, image selection processing unit 122 may perform processing to make transition to a portion including a next item.

In the above example, provision of previous item button 1010 and next item button 1020 allows a user to select transition to any of a next item and a previous item. However, other methods may be employed to allow a user to select a direction of transition. For example, when a bookmark item or an extracted item in the document image is selected, image selection processing unit 122 may display a pop-up window to confirm whether to move to a next item or a previous item. Alternatively, setting unit 116 may set beforehand whether to move to a next item or a previous item when an item is selected.

Fourth Embodiment

The bookmark displayed in the preview image in each of the embodiments described above has all of the extracted items as bookmark items. In contrast, in the present embodiment, image processing system 1 displaying a bookmark having only a portion of the extracted items as bookmark items will be described.

Since the configuration of image processing system 1 in accordance with a fourth embodiment is substantially the same as that described in each of the embodiments described above, description thereof will not be repeated here. However, the processing performed by image selection processing unit 122 is different from that in each of the embodiments described above, as described below.

Image selection processing unit 122 of image processing system 1 in accordance with the present embodiment generates a preview image displaying only extracted items that are set to be displayed, as bookmark items.

Figure 11:
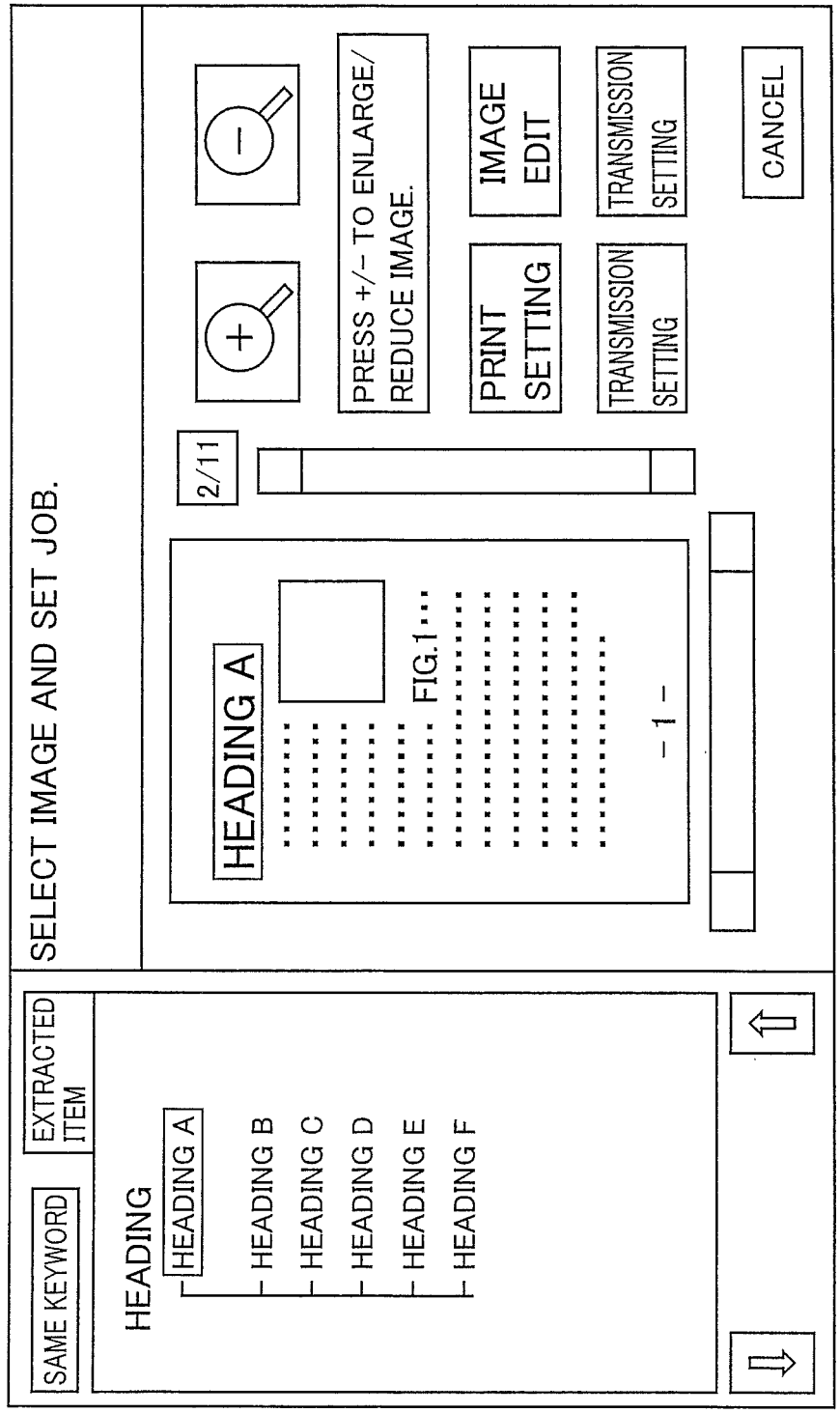
FIG. 11 shows an exemplary preview image displaying items having an attribute "heading" as bookmark items.

One example of such a preview image is shown in FIG. 11. FIG. 11 shows an exemplary preview image displaying items having the attribute "heading" as bookmark items.

A display setting is stored in setting DB 117. Image selection processing unit 122 reads the display setting stored in setting DB 117, and determines a display form of the bookmark in the preview image. The display setting can be modified by a user. Specifically, setting unit 116 stores in setting DB 117 a display setting set based on an instruction received by input apparatus 115.

Image selection processing unit 122 in accordance with the present embodiment displays only items having an identical attribute, such as displaying only items having the attribute "heading" as shown in FIG. 11, or displaying only items having the attribute "figure". A user can easily specify a desired document image with reference to the bookmark in which only items having an identical attribute are displayed as described above.

Referring to FIG. 11 again, it is assumed herein that an item selected in the document image is also selected in the bookmark. Specifically, a bookmark item "Heading A" corresponding to "Heading A" selected in the document image is selected, and displayed in the bookmark with being surrounded with a frame. Then, as described in the first embodiment, when the bookmark item "Heading A" is selected, image selection processing unit 122 specifically displays a portion including heading B.

However, when an item displayed in the bookmark is selected, image selection processing unit 122 may generate a preview image of a document image including an extracted item linked to the selected item in the bookmark, as with the table of contents in the PDF or the like.

Fifth Embodiment

The display form of an extracted item in a document image or a preview image is not limited to those shown in FIGS. 5 to 11.

In a fifth embodiment, image processing system 1 generating a preview image displaying each extracted item in a characteristic form will be described.

Since the configuration of image processing system 1 in accordance with the fifth embodiment is substantially the same as that described in each of the embodiments described above, description thereof will not be repeated here. However, the processing performed by image selection processing unit 122 is different from that in each of the embodiments described above, as described below. In the fifth embodiment, image selection processing unit 122 generates a preview image displaying each extracted item in a characteristic form.

Figure 12:
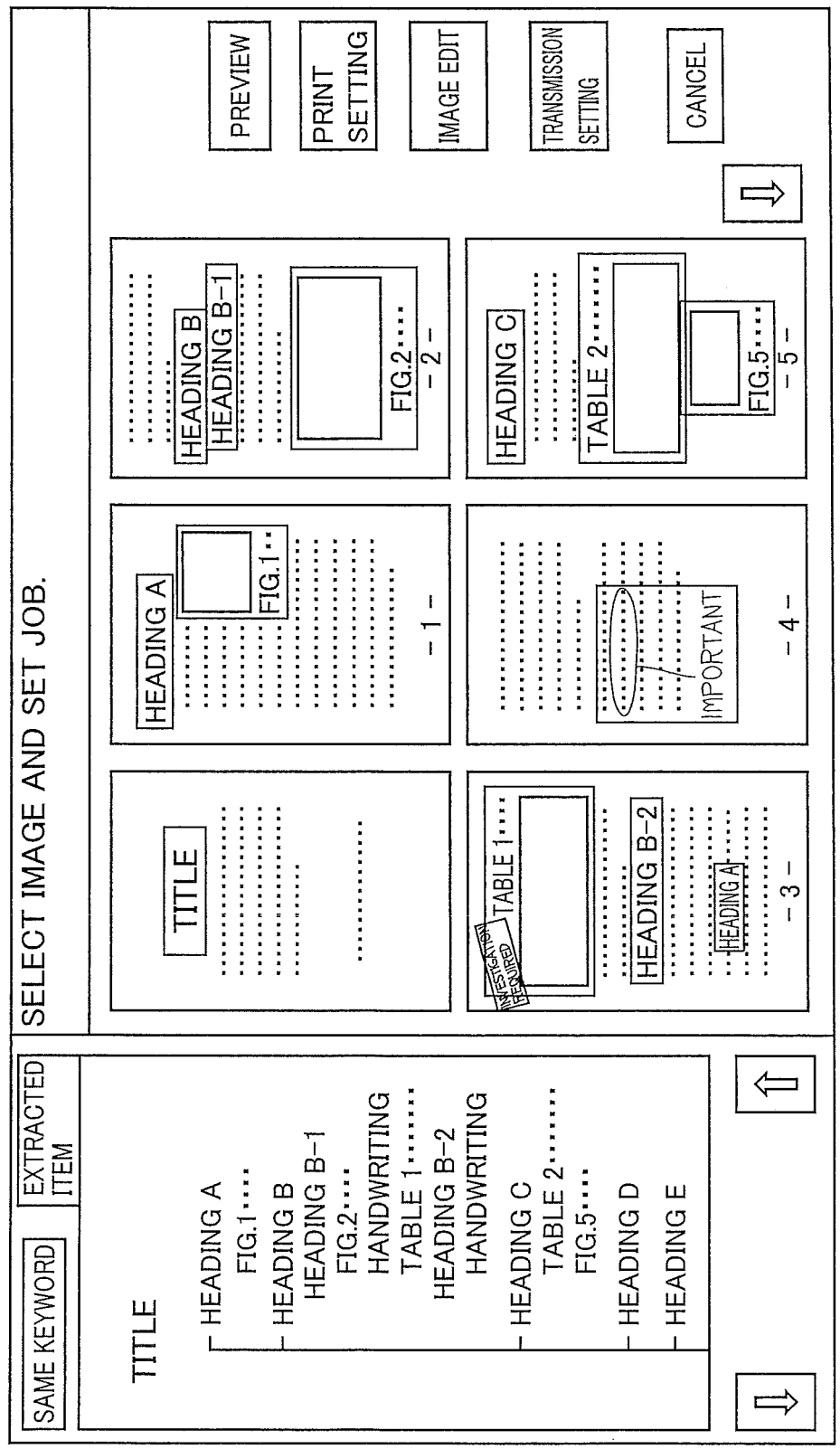
FIG. 12 shows an exemplary preview image thumbnailing the document with extracted items surrounded with frames.

For example, image selection processing unit 122 may generate a preview image in which extracted item portions in the document images are surrounded with frames as shown in FIG. 12. FIG. 12 shows an exemplary preview image thumbnailing the document with extracted items surrounded with frames.

Figure 13:
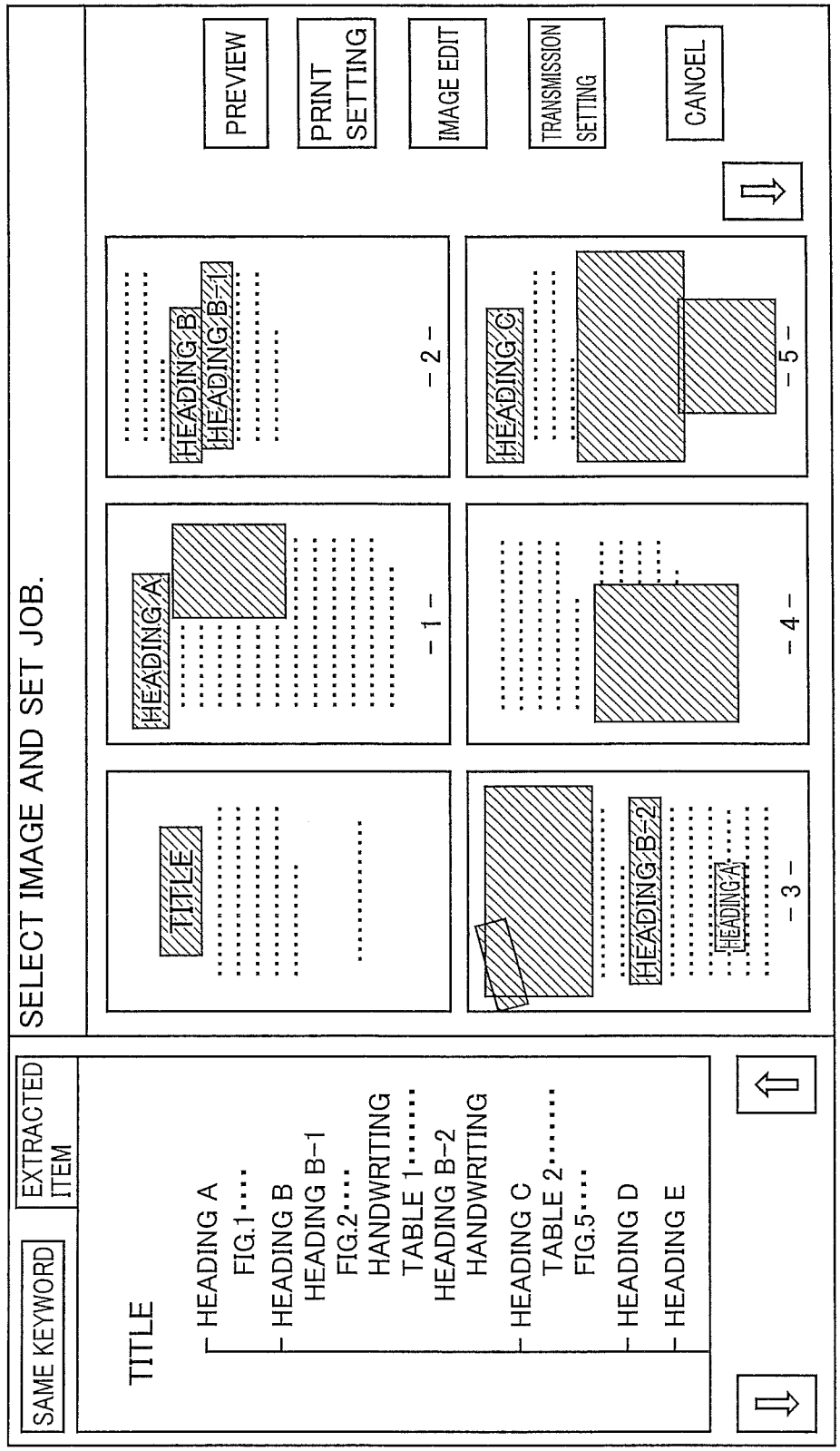
FIG. 13 shows an exemplary preview image thumbnailing the document with extracted item portions highlighted.

Alternatively, image selection processing unit 122 may generate a preview image in which extracted item portions in the document images are highlighted as shown in FIG. 13. FIG. 13 shows an exemplary preview image thumbnailing the document with extracted item portions highlighted. A color setting for highlighting is stored in setting DB 117, and a user can change the color setting. Further, different colors may be set for the respective attributes of the extracted items.

Figure 14:
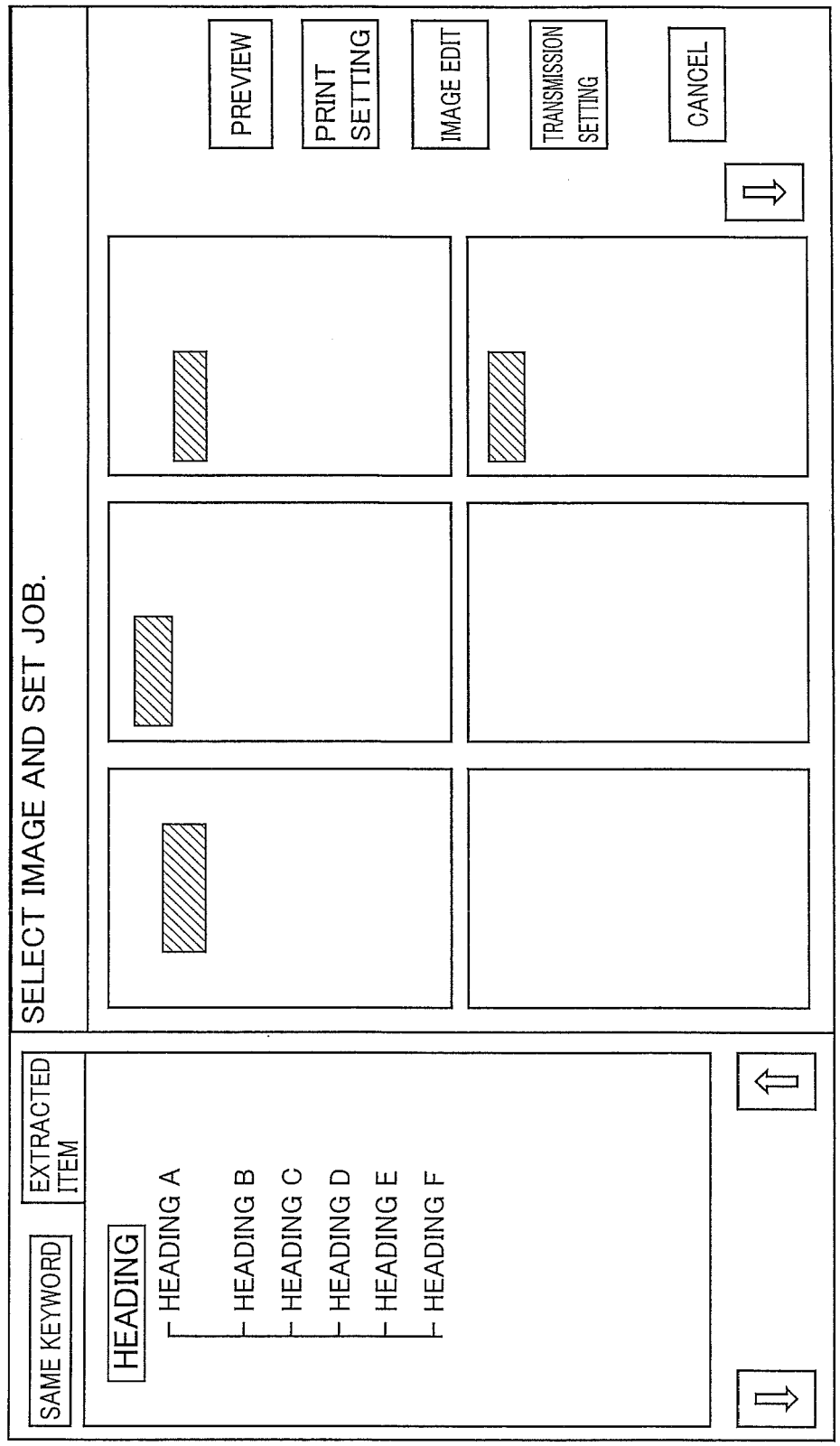
FIG. 14 shows an exemplary preview image displaying only areas of extracted items in the document.

Alternatively, image selection processing unit 122 may generate a preview image displaying only areas of extracted items in the document images as shown in FIG. 14. FIG. 14 shows an exemplary preview image displaying only areas of extracted items in the document.

Preview images as shown in FIGS. 12 to 14 improve image visibility and allow a user to easily specify a desired image. Further, in generating a preview image as shown in FIG. 14, image selection processing unit 122 does not have to generate thumbnail images. Accordingly, image selection processing unit 122 can display a preview image quickly.

Figure 15:
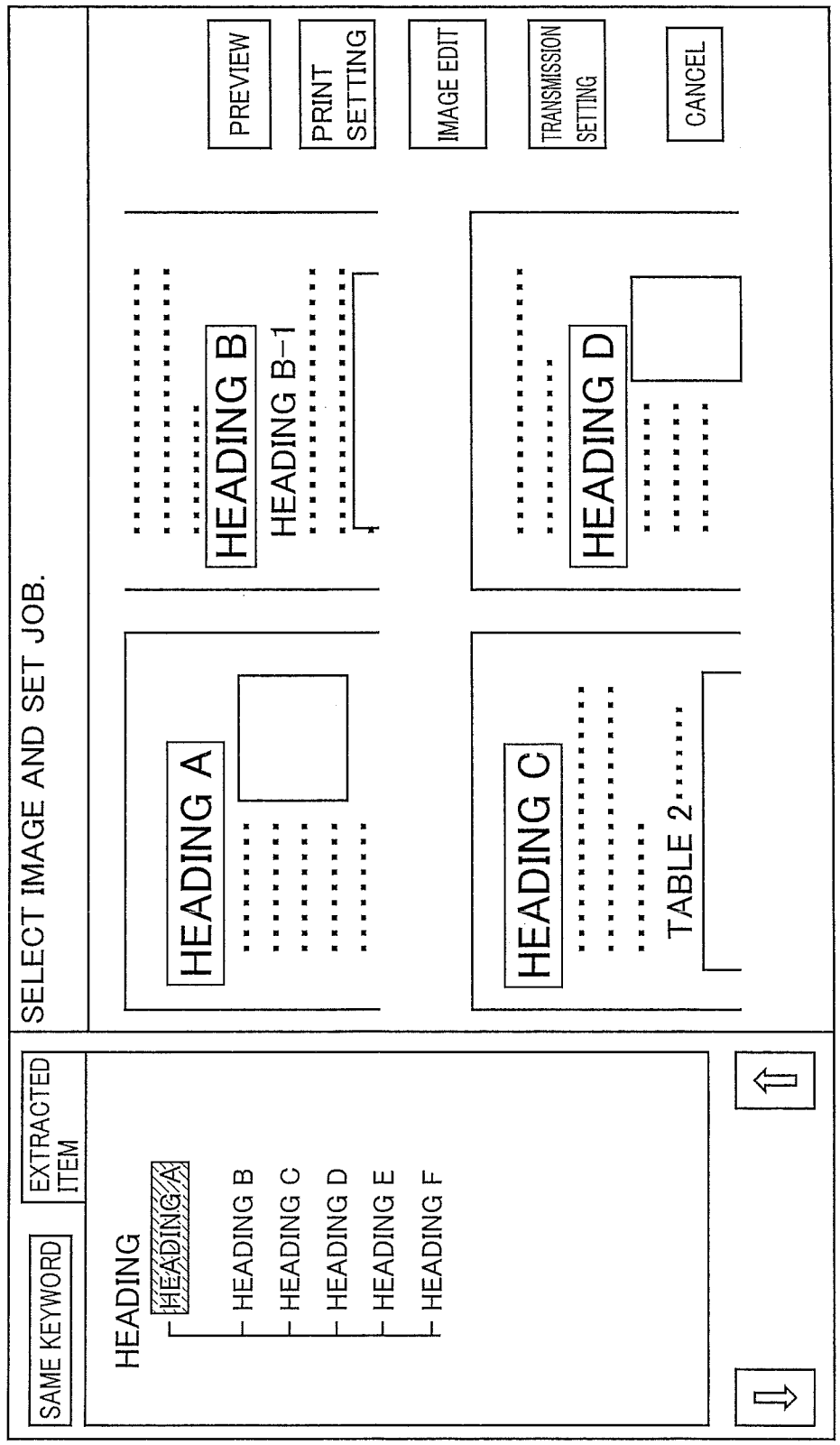
FIG. 15 shows an exemplary preview image thumbnailing the document with areas adjacent to extracted items enlarged.

Image selection processing unit 122 may generate a preview image with an area including an extracted item in the document enlarged. FIG. 15 shows an example of such a preview image. FIG. 15 shows an exemplary preview image thumbnailing the document with areas adjacent to extracted items enlarged.

The enlargement range of the area including an extracted item, the enlargement ratio, and the like are predetermined. However, these may be set by a user.

By displaying images with the periphery of extracted item portions enlarged as described above, image visibility is improved and a user can easily specify a desired image.

Sixth Embodiment

In a sixth embodiment, image processing system 1 automatically specifically displaying an item classified into a specific group first in preview display will be described.

Since the configuration of image processing system 1 in accordance with the sixth embodiment is substantially the same as that described in each of the embodiments described above, description thereof will not be repeated here. However, the processing performed by image selection processing unit 122 is different from that in each of the embodiments described above, as described below.

Figure 16:
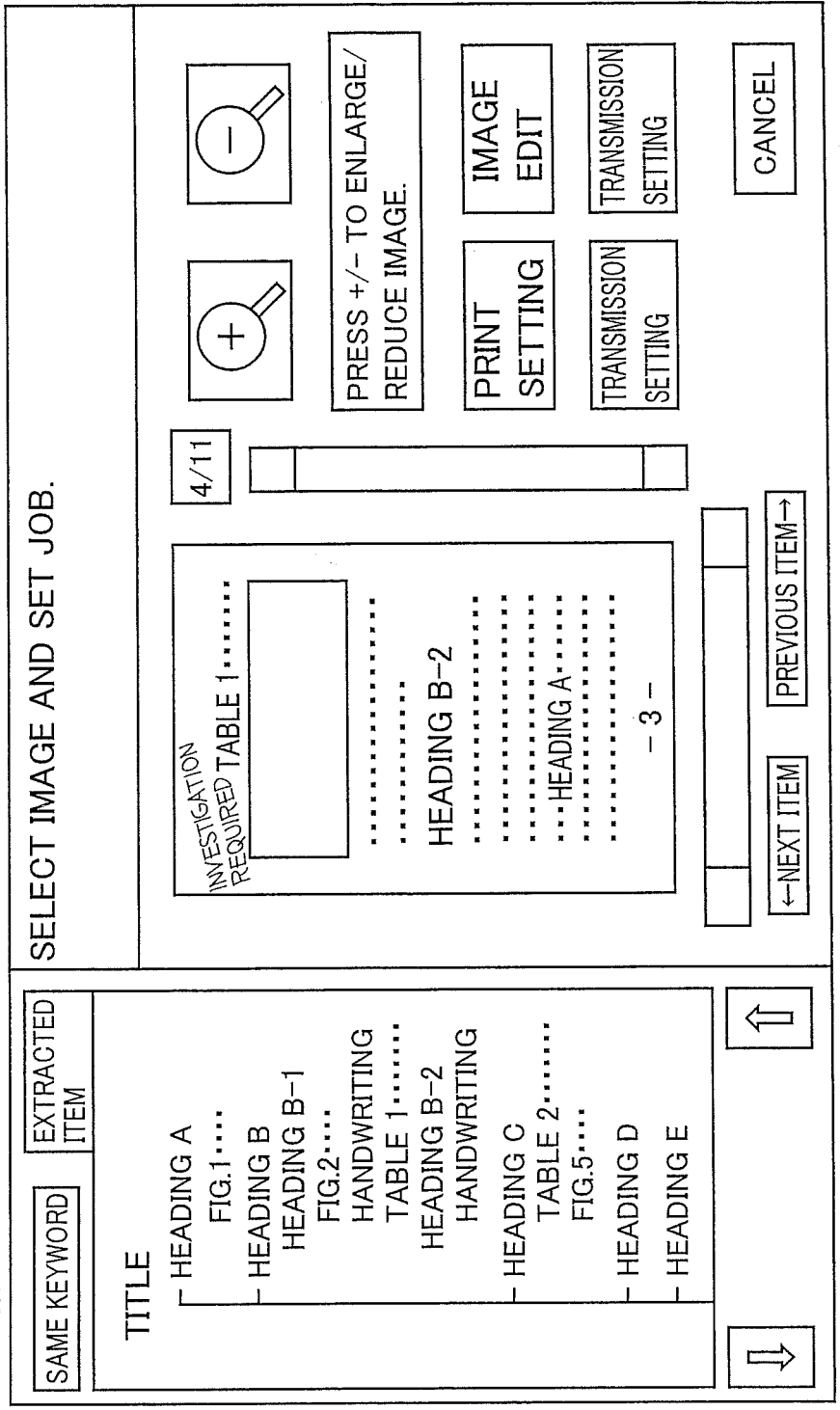
FIG. 16 shows a preview image displayed first by an image processing system in accordance with a sixth embodiment.

A case where a page including an item having the attribute "handwriting" is previewed first will be described herein. The item to be specifically displayed first may be set beforehand, or may be set by a user. Herein, upon receiving an instruction to generate a preview image, image selection processing unit 122 first generates a page including an item having the attribute "handwriting" as shown in FIG. 16, according to a setting. FIG. 16 shows a preview image displayed first by image processing system 1 in accordance with the sixth embodiment.

In the case of displaying thumbnail images, image selection processing unit 122 generates a preview image specifically displaying the page shown in FIG. 16 (for example, with the page surrounded with a frame).

According to image processing system 1 in accordance with the present embodiment, an item classified into a specific group can be specifically displayed first in a preview image, and thus a user can easily specify a desired image.

Others

The present invention of course includes any appropriate combination of the embodiments described above.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image processing apparatus, comprising:
 a display for displaying data;
 an input apparatus for receiving an external instruction,
 a scanner for scanning a document to obtain read data; and
 a controller configured to control the image processing apparatus for extracting at least one item included in said read data,
 classifying the at least one extracted item into one of a plurality of groups,
 generating a bookmark item corresponding to said at least one extracted item, wherein the bookmark item is a link to the at least one extracted item,
 causing said display to display an image including said bookmark item and the at least one extracted item, and
 causing said display to display said at least one extracted item included in said read data in a manner different for each group into which said at least one extracted item is classified,
 wherein said controller receives a selection of the at least one extracted item included in said read data displayed on said display based on the external instruction from said input apparatus, and
 causes said display to display a second item that belongs to a same group of said selected at least one extracted item.

2. The image processing apparatus according to claim 1, wherein said controller sets the at least one extracted item based on an external instruction.

3. The image processing apparatus according to claim 1, wherein said controller extracts said at least one extracted item from among items including: a title, a heading, a figure, a table, a photograph, handwriting, and a keyword included in said read data.

4. The image processing apparatus according to claim 1, wherein
 said controller determines whether said read data is a photograph, and
 when said read data is a photograph, said controller extracts entire said read data.

5. The image processing apparatus according to claim 1, wherein said controller classifies said at least one extracted item into the one of said plurality of groups based on an attribute set for said at least one extracted item.

6. The image processing apparatus according to claim 1, wherein said controller
 extracts at least one keyword included in said read data, and
 classifies said at least one extracted item into a group when the at least one extracted item contains said at least one keyword.

7. The image processing apparatus according to claim 1, wherein said controller causes said display to display said second item, wherein the second item is a previous item or a next item included in said read data displayed on said display, based on the external instruction from said input apparatus.

8. The image processing apparatus according to claim 1, wherein said controller causes said display to display said at least one extracted item included in said read data in a form that allows said at least one extracted item to be easily specified.

9. The image processing apparatus according to claim 8, wherein said controller causes said display to highlight an area including said at least one extracted item.

10. The image processing apparatus according to claim 8, wherein said controller causes said display to display a frame for said at least one extracted item.

11. The image processing apparatus according to claim 8, wherein said controller causes said display to display said at least one extracted item in an enlarged manner.

12. The image processing apparatus according to claim 1, wherein said controller causes said display to first display said at least one extracted item belonging to a prescribed group of said plurality of groups.

13. The image processing apparatus according to claim 1, wherein said manner of displaying each group utilizes a surrounding frame, highlighting color, or enlarging the areas adjacent to said extracted item.

14. An image processing apparatus comprising:
 a display for displaying data;
 an input apparatus for receiving an external instruction,
 a scanner for scanning a document to obtain read data; and
 a controller configured to control the image processing apparatus for extracting at least one item included in said read data,
 classifying the at least one extracted item into one of a plurality of groups,
 generating a bookmark item corresponding to said at least one extracted item, wherein the bookmark item is a link to the at least one extracted item,
 causing said display to display an image including said bookmark item and the at least one extracted item, and
 causing said display to display said at least one extracted item included in said read data in a manner different for each group into which said at least one extracted item is classified,
 wherein said controller
 receives selection of said bookmark item displayed on said display based on the instruction from said input apparatus, and
 causes said display to display a second item that belongs to a same group of said at least one extracted item corresponding to said selected bookmark item.

15. The image processing apparatus according to claim 14, wherein said controller causes said display to display said second item, wherein the second item is a previous item or a next item included in said read data displayed on said display, based on the external instruction from said input apparatus.

16. An image processing method, comprising the steps of:
 obtaining read data by scanning a document;
 extracting at least one item included in said read data;
 classifying said at least one extracted item into one of a plurality of groups;
 generating a bookmark item corresponding to said at least one extracted item, wherein the bookmark item is a link to the at least one extracted item,
 causing said display to display an image including said bookmark item and the at least one extracted item; and
 displaying on a display said at least one extracted item included in said read data in a manner different for each group into which said at least one extracted item is classified,
 receiving an external instruction from an input apparatus,
 receiving a selection of the at least one extracted item included in said read data displayed on said display based on the external instruction from said input apparatus, and
 causing said display to display a second item that belongs to a same group of said selected at least one extracted item.

17. The image processing method according to claim 16, further comprising displaying each group in said manner with a surrounding frame, highlighting color, or enlarging the areas adjacent to said extracted item.

18. An image processing method, comprising the steps of:
obtaining read data by scanning a document;
extracting at least one item included in said read data;
classifying said at least one extracted item into one of a plurality of groups;
generating a bookmark item corresponding to said at least one extracted item, wherein the bookmark item is a link to the at least one extracted item,
causing said display to display an image including said bookmark item and the at least one extracted item;
displaying on a display said at least one extracted item included in said read data in a manner different for each group into which said at least one extracted item is classified;
receiving an external instruction from an input apparatus;
receiving a selection of said bookmark item displayed on said display based on the external instruction from said input apparatus; and
causing said display to display a second item that belongs to a same group of said selected at least one extracted item corresponding to said selected bookmark item.

* * * * *